United States Patent
Lu et al.

(10) Patent No.: US 6,983,319 B1
(45) Date of Patent: Jan. 3, 2006

(54) DYNAMIC PORT MANAGEMENT

(75) Inventors: Wei Lu, Coppell, TX (US); Junan Duan, Lewisville, TX (US)

(73) Assignee: Permeo Technologies, Inc., Irving, TX (US)

( * ) Notice: Subject to any disclaimer, the term of this patent is extended or adjusted under 35 U.S.C. 154(b) by 675 days.

(21) Appl. No.: 09/827,742

(22) Filed: Apr. 6, 2001

(51) Int. Cl.
*G06F 15/173* (2006.01)

(52) U.S. Cl. .................... 709/223; 709/227; 370/389; 370/392

(58) Field of Classification Search ........ 709/223–227; 370/389–392
See application file for complete search history.

(56) References Cited

U.S. PATENT DOCUMENTS

| | | | |
|---|---|---|---|
| 5,636,216 A | 6/1997 | Fox et al. .................... 370/402 |
| 5,793,763 A | 8/1998 | Mayes et al. ................ 370/389 |
| 5,802,278 A * | 9/1998 | Isfeld et al. ................. 709/249 |
| 5,815,664 A | 9/1998 | Asano ..................... 395/200.57 |
| 5,835,726 A | 11/1998 | Shwed et al. ........... 395/200.59 |
| 6,047,325 A | 4/2000 | Jain et al. .................... 709/227 |
| 6,055,236 A | 4/2000 | Nessett et al. ............... 370/389 |
| 6,157,636 A | 12/2000 | Voit et al. .................... 370/353 |
| 6,175,867 B1 | 1/2001 | Taghadoss .................. 709/223 |
| 6,353,614 B1 * | 3/2002 | Borella et al. ............... 709/238 |
| 6,535,511 B1 * | 3/2003 | Rao ............................ 370/392 |
| 6,563,824 B1 * | 5/2003 | Bhatia et al. ................ 370/392 |
| 6,661,799 B1 * | 12/2003 | Molitor ....................... 370/401 |
| 6,754,709 B1 * | 6/2004 | Gbadegesin ................. 709/227 |
| 2001/0017862 A1 * | 8/2001 | Tokuyo et al. .............. 709/227 |
| 2002/0133596 A1 * | 9/2002 | Border et al. ............... 709/227 |

\* cited by examiner

*Primary Examiner*—Jeffrey Pwu
(74) *Attorney, Agent, or Firm*—Haynes and Boone, LLP

(57) ABSTRACT

A method and system is disclosed for dynamically managing port and network addresses for a private network using at least one dynamic port management (DPM) driver and a DPM server. The DPM driver is installed on a computer of the private network and the DPM server is installed on a gateway module of the private network. The private network uses a plurality of unregistered network address for its internal uses and has one or more registered network address for communicating with computers outside of the private network. When initiating an application session communicating with at least one computer outside of the private network, a first port is obtained from the DPM driver. A setup process is established for exchanging information between the DPM driver and the DPM server in order to reserve a registered network address and, if the first port is replaceable, for dynamically assigning a second port. The reserved registered network address and the dynamically assigned second port are used for completing communications of the application session.

20 Claims, 7 Drawing Sheets

DYNAMIC PORT MANAGEMENT

BACKGROUND OF THE INVENTION

The present invention relates generally to computer network connections in a large scale network environment, and more particularly, to a system and method for providing addresses and ports for specific nodes in the computer network using a dynamic port management module.

There are many types of computer networks, including local area networks, wide area networks, and the Internet. Companies and organizations often use local or wide area networks as their private networks to link individual nodes (e.g., computers) for email communications, remote access, and internal data sharing. Depending on the sizes of the companies, these private networks can be very large. In order to maintain the integrity of the private networks, the nodes therein are often connected through a gateway to an outside network such as the Internet for additional communication purposes.

Typically, each node will have a unique network address for the private network. The address, however, may not be of the type or format that is commonly used for the another network with which nodes on the private network may communicate. For example, the private network may use an address format other than Internet Protocol (IP), while IP addresses are required for the Internet. In this example, the address used in the private network may not be used for communications with nodes connected to (or through) the Internet. In this situation, the gateway will have to assign a registered IP address to the node of the private network that is communicating with or through the Internet.

What is needed is a system and method for allowing the gateway to properly assign an IP address (or other appropriate address) to facilitate the communication between the nodes of disparate networks.

In addition to properly assigning an IP address to a node in a private network, the gateway must also control the use of ports that are employed in application sessions. What is also needed also is a system and method for network address mapping along with intelligent dynamic port management.

SUMMARY OF THE INVENTION

A method and computer program is provided for dynamically managing port and network addresses for a first network to facilitate communications with computing nodes of a second network. According to one example of the present invention, a dynamic port management (DPM) driver is installed on a computing node of the first network and a DPM server is installed on a gateway between the two networks. The first network uses a plurality of network addresses of a first type (e.g., a type that is not "registered" with the second network) for its internal uses and has one or more registered network addresses for communicating with computer nodes in the second network.

When initiating a communication session with the node in the second network, a "setup" process is then established for exchanging information between the DPM driver and the DPM server in order to reserve a registered network address and, if the first port is replaceable, for dynamically assigning a second port. The reserved registered network address and the dynamically assigned second port may be used for initiating and completing the communication session.

If the first port is not replaceable, the first port can be used for future communications. The information exchanged between the DPM driver and the DPM server can also indicate a network address and port for the second node that will be communicated by the first node during the communication session.

In some embodiments, the DPM server uses at least one unregistered network address and a predetermined port for communications between the DPM driver and the DPM server. Also, a look-up table is created and updated indicating a one-to-one relationship between the reserved registered network address associated with either the first port or the second port (if the first port is replaced) and the first unregistered network address associated with the computing node having the installed DPM driver. This look-up table can also be used for identifying the node and the DPM driver while executing the communication session. This identification feature can be used for continuing the communication session (e.g., an acknowledgment or reply) when information is sent from the second node to the first node of the first network.

In some embodiments, the DPM server has the ability to reconcile two separate communication sessions requesting the use of the same registered network address and the same port when at least one of the ports is not replaceable. In a typical scenario, the communication session that allows the port to be replaceable will be assigned with a new port by the DPM server.

In some embodiments, the DPM server has the ability to reconcile two separate communication sessions requesting the use of the same registered network address and the same port when neither session deems the port to be replaceable. In this scenario, both communication sessions are distinguished by using the look-up table to indicate the different destination network addresses.

Therefore, the present invention achieves significant advantages by allowing the DPM driver and DPM server to assign available ports dynamically for one or more communication sessions.

DESCRIPTION OF THE PREFERRED EMBODIMENT

The present invention provides a new and unique method for dynamic network address and network port management. The disclosure below uses various embodiments to illustrate different features of the invention. These embodiments are intended as examples, and are not intended to limit the invention from that described in the claims.

Figure 1:
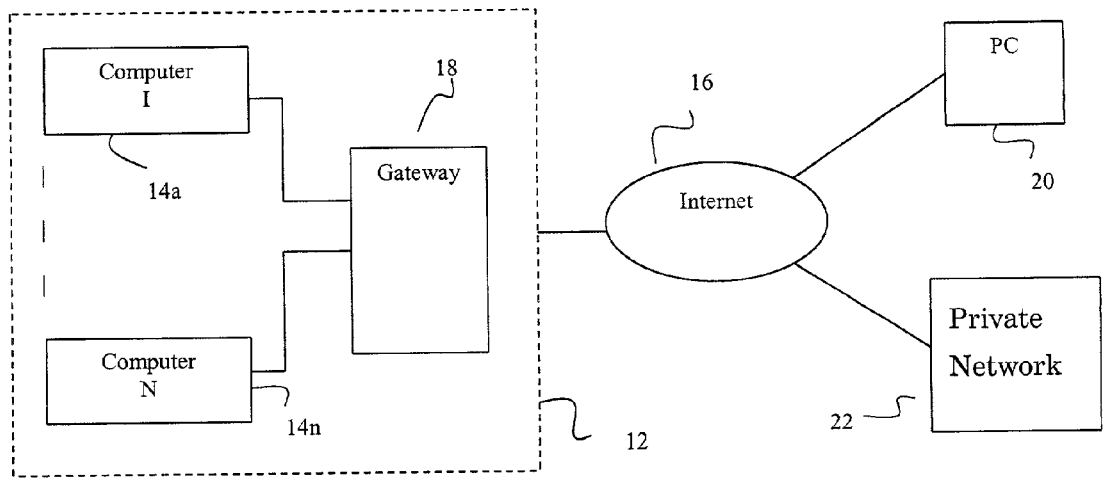
FIG. 1 illustrates a schematic of a network computing environment.

Referring now to FIG. 1, a network computing environment 10 includes a private network 12 having internally networked computers 14a–14n. The private network 12 is also connected to the Internet 16 via a gateway 18. In the present example, any computing node or computer 14a–14n inside the private network 12 can communicate with each other, or a computer connectable through the Internet 16 such as a computer 20 or a computer of another private network 22. In furtherance of the example, the information exchanged between any two computers is in the form of data packets and uses a mutually acceptable network protocol such as the Internet Protocol ("IP").

Figure 2:
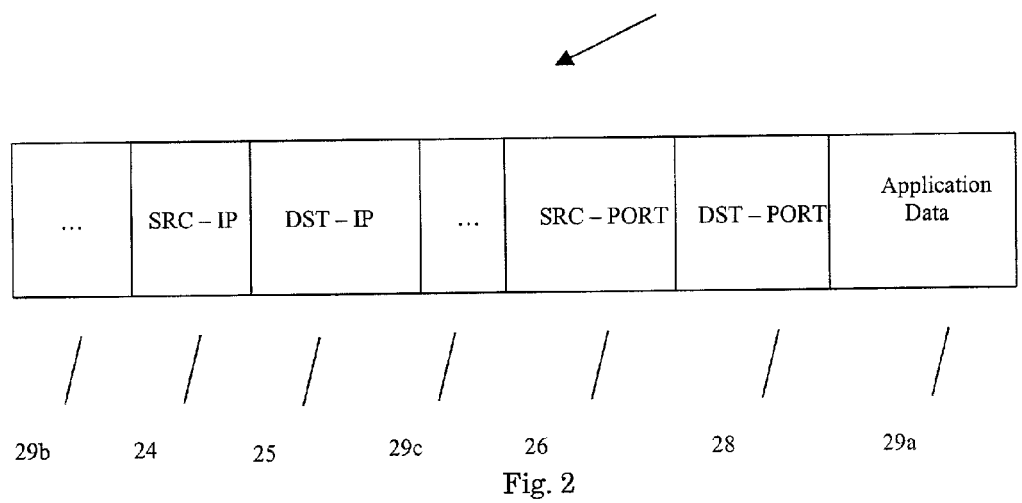
FIG. 2 illustrates a sample data packet.

Referring to FIG. 2, a sample data packet 23 includes header information about the source and destination computers in communication. A first section 24 indicates the IP address of the originating/source host/computer, and a second section 25 indicates the IP address of the destination host/computer. Sections 26 and 28 are identifiers for transport layers (e.g., TCP ports) such as a source port 26 and a destination port 28. The packet 23 also contains sections such as the data section 29a and various other sections (e.g., section 29b and 29c) that may not be directly relevant to the present invention. With the information contained in these sections of the data packet 23, the packet can be routed from network to network, and from computer to computer with ease.

As of today, an IP address is defined by a 32-bit host address represented in dotted decimal notation (e.g. 10.234.34.4). Limited by its own definition of the 32-bit structure, only 4,294,967,296 unique IP addresses are available for the entire Internet, which far exceed the demands from all the computers connected or connectable to the Internet. Therefore, the private network 12 uses a limited number of IP addresses instead of assigning IP addresses for all the computers 14a–14n. The IP addresses for use with the Internet 16 are called "registered" network addresses, and all others for internal use inside of the private network are known as "unregistered" network addresses. The use of unregistered network addresses inherently generates a conflicting problem for communications between two computers that do not belong to the same private network because all the computers in the private network 12 are not individually identified with their own registered IP addresses.

Consequently, in order for computers 14a–14n inside the private network 12 to access computers or servers outside, registered IP addresses must be used. Conventionally, the gateway 18 performs network address translation (NAT) or network address port translation (NAPT) to identify and distinguish the source and destination of the transmitted packet to/from the computers 14a–14n. In a more generic term, NAT refers to translations of network addresses and related fields in a packet to make it recognizable to a private network and a public network. NAPT is a specific case of NAT in which modifications are made to the packets in the segments/sections containing transport layer identifiers (e.g., TCP/UDP ports) and their related fields.

Viewing inside of the private network 12, each computer (e.g., 14a) is assigned independently an IP address which is only known to the private network (i.e., the unregistered IP address or the unregistered network address), therefore communications among the computers inside the private network can be facilitated. Assuming the private network 12 has a set of registered network addresses or registered IP addresses, there is a mapping mechanism available at the location of the gateway to swap the unregistered IP address to one of the registered IP addresses.

For the sake of further example, it is assumed that a user on computer 14a initiates an FTP session with a server computer situated outside the private network 12. The computer 14a sends a packet that contains a source IP address of 10.5.5.5 and a destination IP address of 200.2.22.222. The destination IP address indicates that the destination is outside of the private network 12. Since the source IP address 10.5.5.5 is unknown outside of the private network, a return packet from the destination computer using the destination IP address 10.5.5.5 will not reach the computer 14a. Therefore, before the initial packet is sent out from the private network 12, the gateway 18 maps or translates the source IP address to one of the registered IP addresses (e.g., 188.88.8.88). This unique relationship between the unregistered IP address and the mapped registered address is stored in the gateway 18 for future use. With the recognizable IP address of 188.88.8.88, a return packet from the outside server will be delivered to the gateway, and the gateway would once again translate the destination IP address to 10.5.5.5 and forward the packet to computer 14a so that the original FTP session can continue.

Figure 3:
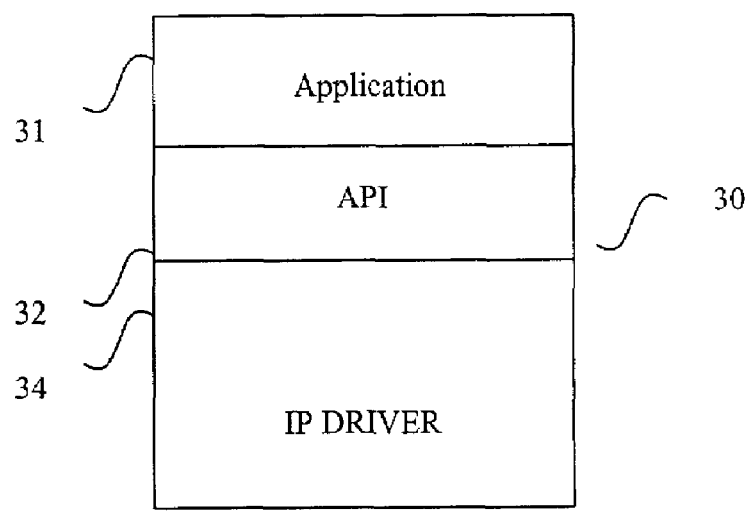
FIG. 3 illustrates a schematic showing computer architectural layers for an application, its API, and an IP driver.

Referring now to FIG. 3, for any particular application on a computer using IP addresses and port numbers (or ports in short), there are three architectural communication entities/layers as shown in block 30, the application 31, the specific application interface (API) 32, and the IP driver 34. When the application initiates a session, it asks the operating system (e.g., Socket) for a port number. The assigned port number, along with the IP address associated with the computer, is sent to the IP driver, which further furnishes each upcoming packet with the IP address and the assigned port number in its header portion.

Figure 4:
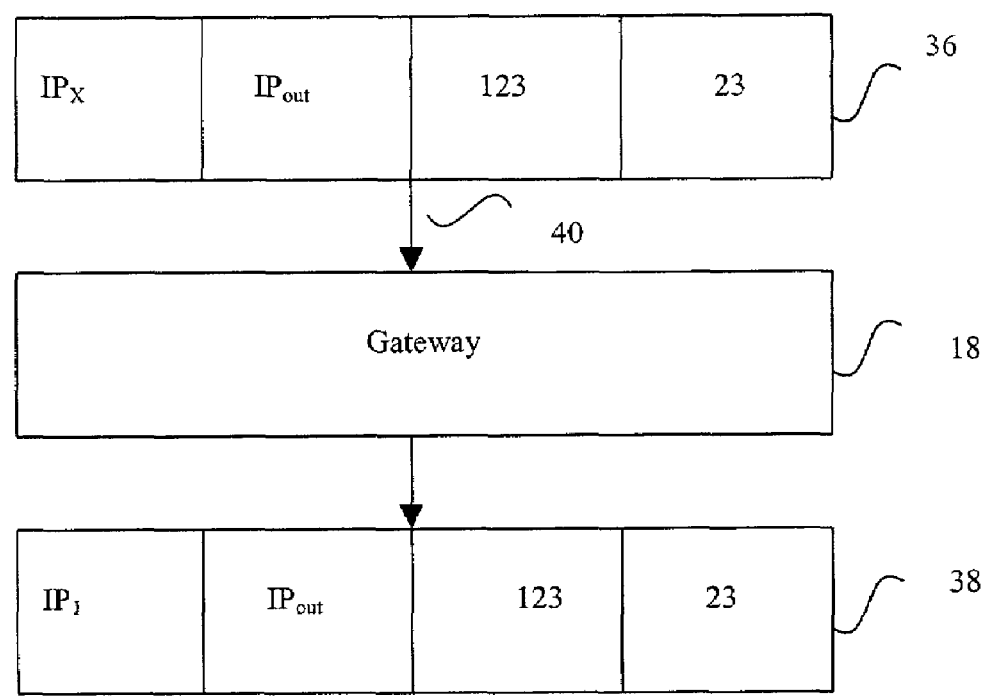
FIG. 4 illustrates a network address translation feature performed by a gateway module.

Referring to FIG. 4, conventionally, the gateway 18 uses the NAT feature to simply replace the source's unregistered address with a registered IP address. For example, if the computer in a private network, which bears an IP address of IPx, initiates an FTP session to an outside server having an IP address of $Ip_{out}$ and a port number 23, the header portion of the packet will look like block 36. As it has been described with regard to FIG. 2, this header section of the packet indicates that the packet is from a computer having a source IP address of IPx and a source port of 123, and that the packet is intended to be routed to a computer with an IP address of $IP_{out}$ and port 23. When a conventional gateway or other NAT management module receives this packet, the source IP address of the packet is changed to a registered IP address, such as $IP_1$ as shown in block 38. The IP driver then sends the packet out.

A lookup table (not shown) is also created to indicate that the IP address-port pair IPx:123 has been changed to $IP_1$:123. Therefore, when a return packet is received by the gateway bearing the destination IP address of $IP_1$ and port 123, it can be routed correctly to IPx and port 123. It is noticed that the gateway usually does not change the port number. If the port 123 is used by an application session, then this port will not be available to other applications in the private network for a period of time. This hinders the efficiency of the usage of available ports. On the other hand, if an NAPT is done, and an available port is dynamically chosen by the gateway for sending out the packet, when a return packet comes back bearing the dynamically chosen port number, the application may not be able to further the communication. The reason is that certain applications are required to use a particular port, and an alteration of the port may cause a disruption of future communications.

Figure 5:
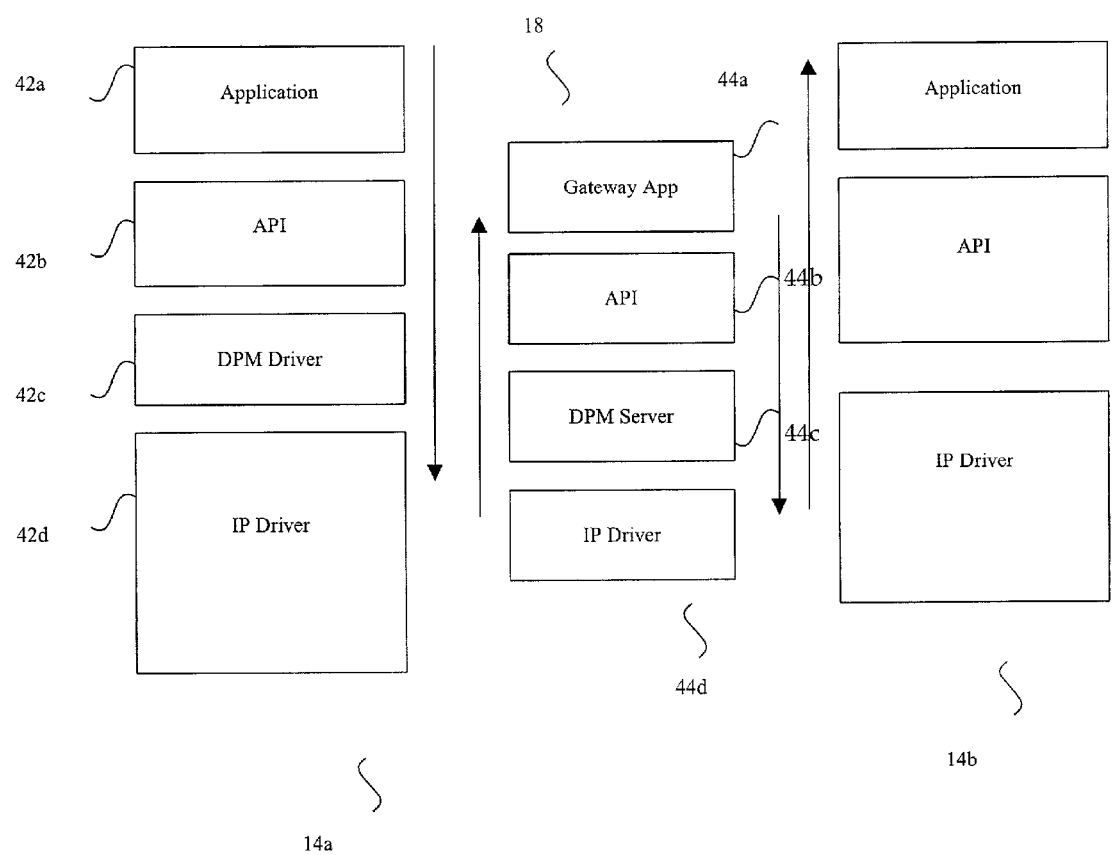
FIG. 5 illustrates a layer schematic for including a DPM server-driver pair for managing network address mapping and port assignment according to one example of the present invention.

Referring now to FIG. 5, a gateway 18 integrated with a Dynamic Port Management (DPM) server is situated between an originating computer 14*a* with applications and the DPM driver, and a destination computer 14*b*. Although only one originating computer 14*a* is shown, it is assumed that a DPM driver is provided at each of the computers 14*a*–14*n* of the private network 12 (FIG. 1). According to one example of the present invention, an application 42*a* communicates with its API 42*b*, and then, communicates with the DPM driver 42*c* instead of communicating directly with an IP driver 42*d*. At the gateway 18, the same structure is formed for a gateway application 44*a*, its API 44*b*, the DPM server 44*c*, and the IP driver 44*d* for the gateway. It is further noted that the arrows shown in FIG. 5 indicate the direction of communications among different layers. Comparing to FIG. 3, it is clear that the DPM server/driver layer controls information exchanged between the API layer and the IP driver, and thus builds intelligence into the communications among all three layers. With this structure, the IP address and port information is not modified at the packet level, but done by using higher level communications between the DPM driver and the DPM server.

Figure 6:
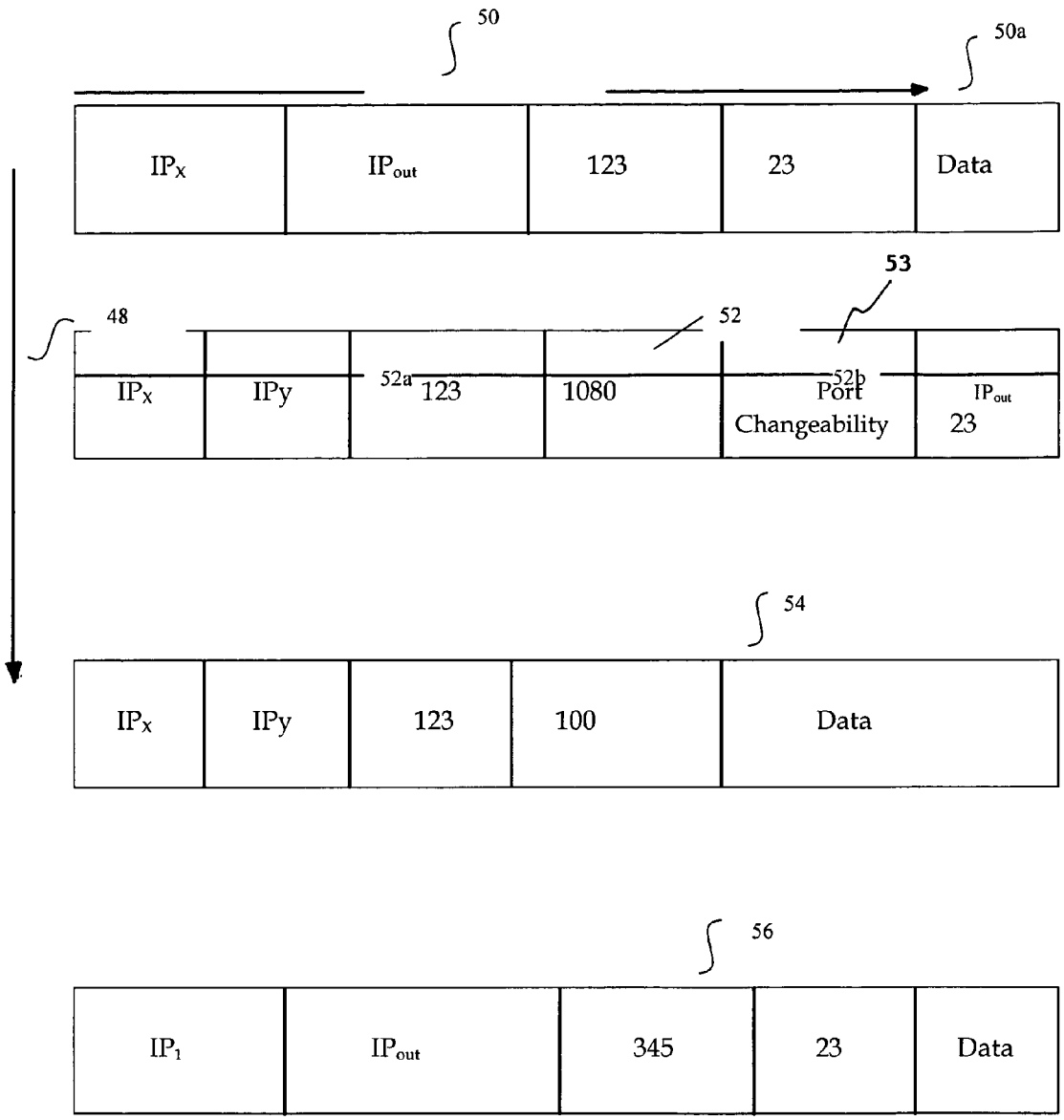
FIG. 6 illustrates manipulations made to the packets by the DPM driver and the DPM server of FIG. 5 according to one example of the present invention.

Referring now to FIG. 6 in conjunction with FIG. 5, the DPM driver/server layer (42*c*/44*c*) changes the packets as shown by arrow 48 according to one example of the present invention. Continuing with the FTP session example discussed above, when the computer 14*a* initiates the FTP session, a communication is first made by the API 42*b* to the DPM driver 42*c* installed on the computer 14*a* to obtain a port number for the session. When the DPM driver 42*c* assigns the port number to the API 42*b*, it indicates whether the port number is changeable/replaceable or not. For illustration purposes, it is assumed that the port number assigned is 123 and the IP address is IPx for the computer 14*a*, and the FTP server in the destination computer 20 bears the IP address of $IP_{out}$ and port 23. Relevant header sections 50 of the outgoing data packet is shown to include information about $IP_x$:123 pair and $IP_{out}$:23 pair. A data section 50*a* follows the header 50 in the packet. While the application layer 42*a* conveys this information to the IP driver 42*d* through its API 42*b* and the DPM driver 42*c*, before sending other data packets using the header 50, the DPM driver 42*c* communicates with the DPM server 44*c* to "setup" the packets by informing the DPM server 44*c* that the upcoming FTP session should be directed to the outside FTP server 20.

This "setup" process may use a plurality of packets communicated between the DPM driver 42*c* and the DPM server 44*c*. For instance, any given packet 52 will have a header section 52*a*. In these packets, the source IP address/port will still be IPx/123 as assigned by the DPM driver, however the destination IP address is now an unregistered IP address of the DPM server IPy, and the port is fixed to a predetermined one of the gateway such as a "well-known" port 1080. The information about the true/final destination (e.g., the destination computer 20) is embedded in a data section 52*b* of the packet which should include at least, in this case, $IP_{out}$:23 and an indicator about the replaceability of the port number, as inidcated by data field 53. It is understood that since this destination information and port replaceability is contained in the data section of the packet, not the header section, various methods can be implemented to have both the DPM driver and server to agree on a predetermined mechanism for each of them to extract such information.

Also during the setup process, after the DPM server 44*c* has obtained information about the upcoming FTP session, it informs the DPM driver 42*c* an appropriate port (e.g., 100) and its IP address (e.g., IPy) for altering the IP address and port information for each packet initiated by the application for the FTP session. The DPM driver 42*c* "misleads" the IP driver 42*d* to believe that the packets for the FTP session ought to be sent to the gateway using IPy and port 100 as shown in a sample packet 54 for the FTP session. When the packet 54 arrives at the gateway 18, the DPM server 44*c* can further instruct the IP driver 44*d* at the gateway to modify the header of the packet to include appropriate source and destination IP addresses and ports. For instance, a simplified version of an outgoing packet after the DPM server's manipulation is shown as referenced by numeral 56. The source IP address is now changed to a registered IP address ($IP_1$), the port is changed to 345 (if the port 123 is replaceable), the destination IF address is $IP_{out}$, and the destination port switches to port 23.

Figure 7:
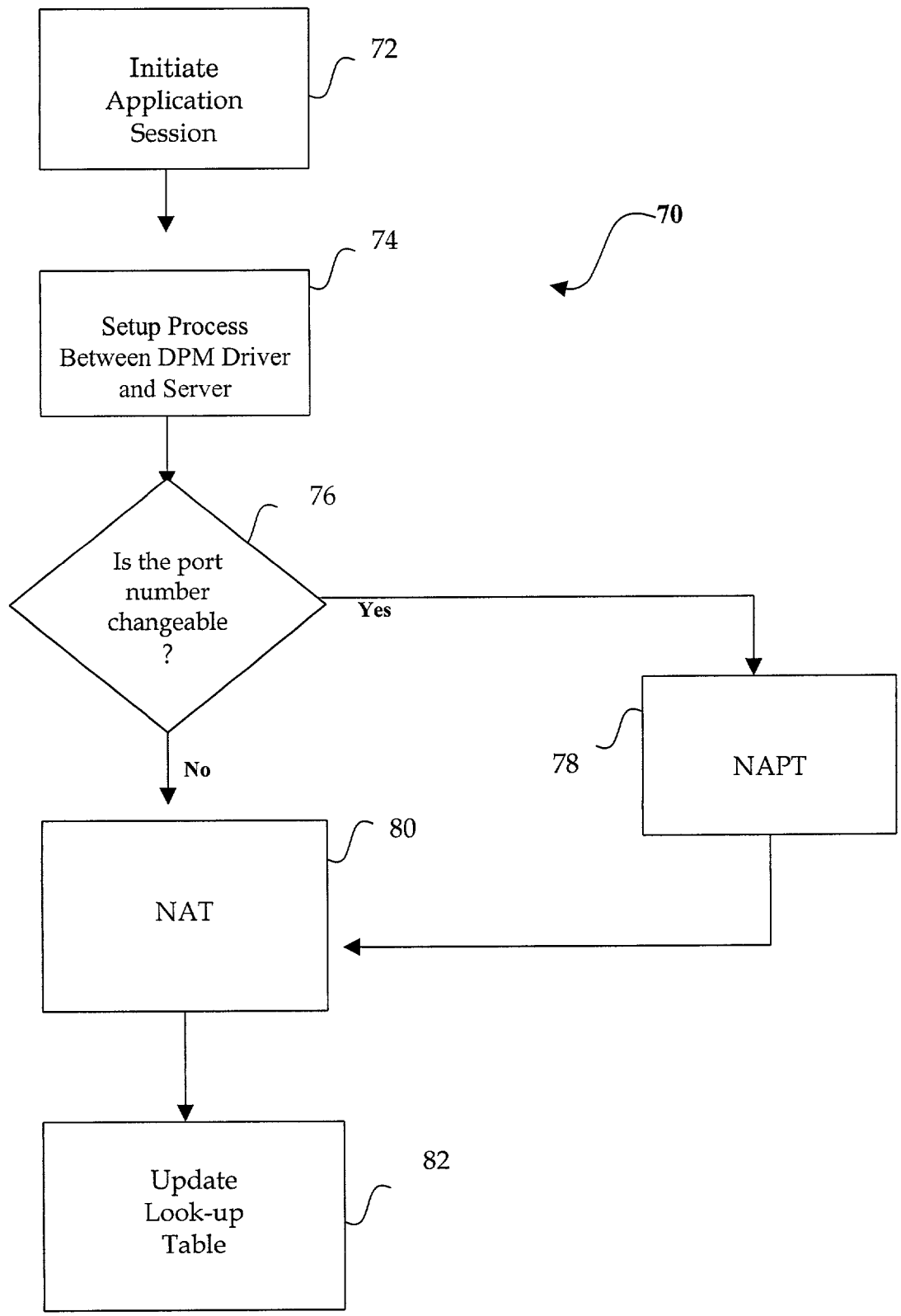
FIG. 7 illustrates a flow diagram showing a process for completing the network address mapping and the network port management according to one example of the present invention.
Figure 8:
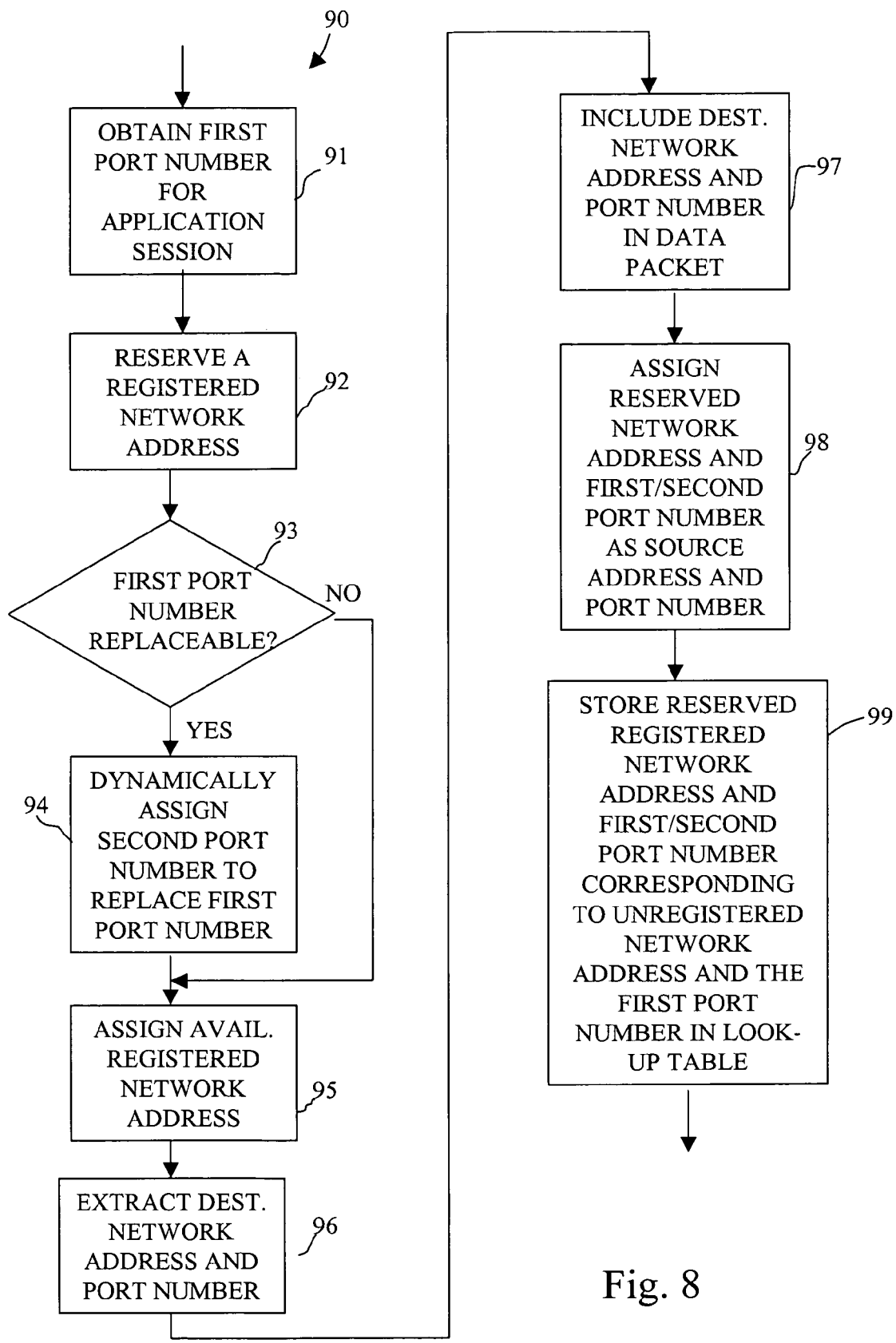
FIG. 8 is a flowchart of an embodiment of a process for dynamic port management.

Referring now to FIG. 7 and also FIG. 8, a flow diagram 70 and a more detailed flowchart 90 summarize the steps taken by the DPM driver and DPM server for manipulating the IP address and port for an application session according to one embodiment of the present invention. Before all the steps are taken, it is assumed that each computer or server is loaded with DPM driver software and the gateway is equipped with DPM server software. Execution begins at step 72, where an application session (communication) is initiated from the DPM driver, and an initial source port is obtained (step 91 in FIG. 8). At step 74, a setup process is executed between the DPM driver and DPM server to inform the DPM server about the final destination IP address and its corresponding port. The DPM server then obtains a port number for the session (step 92 in FIG. 8). At step 76, the DPM server checks to see whether the port number may be changed (step 93 in FIG. 8). This may be done by examining data field 53 in FIG. 6. If so, execution proceeds to step 78 where the DPM server selects an available port, and dynamically assigns this port for all outgoing packets in the session (step 94 in FIG. 8). Once the port is established (either at steps 76 or 78), execution proceeds to step 80 where the DPM server finds an available registered IP address for outgoing packets (step 95 in FIG. 8). To complete the header of the data packet, the destination network address and port number are extracted and included in the data packet (steps 96 and 97 in FIG. 8). The reserved registered network address and the first or second port number (if the port number is not replaced or is replaced) are included in the data packet as the source address and port number (step 98 in FIG. 8). At step 82, a look-up table, which may be stored in the gateway 18, is then updated to reflect the one-to-one relationship between the pair of the originating source IP address (e.g., an unregistered IP address) and the initial port of the application session and the pair of the outgoing registered IP address assigned by the gateway 18 and the dynamically assigned port (step 99 in FIG. 8).

With the above-described DPM driver-server arrangement and their NAT/NAPT features, any available ports can be dynamically assigned, and thus the efficiency of the gateway is significantly improved. To this end, the DPM server needs to productively manage the availability of the ports to the extent possible. If two application sessions (e.g., two FTP sessions from two different computers) are requesting the same port for their respective sessions, in the conventional method, the gateway can only supply the requested port to one of them, and block the other from using the same port. In the present embodiment, this port "crowdiness" can be resolved by the intelligence of the DPM server-driver.

Figure 9:
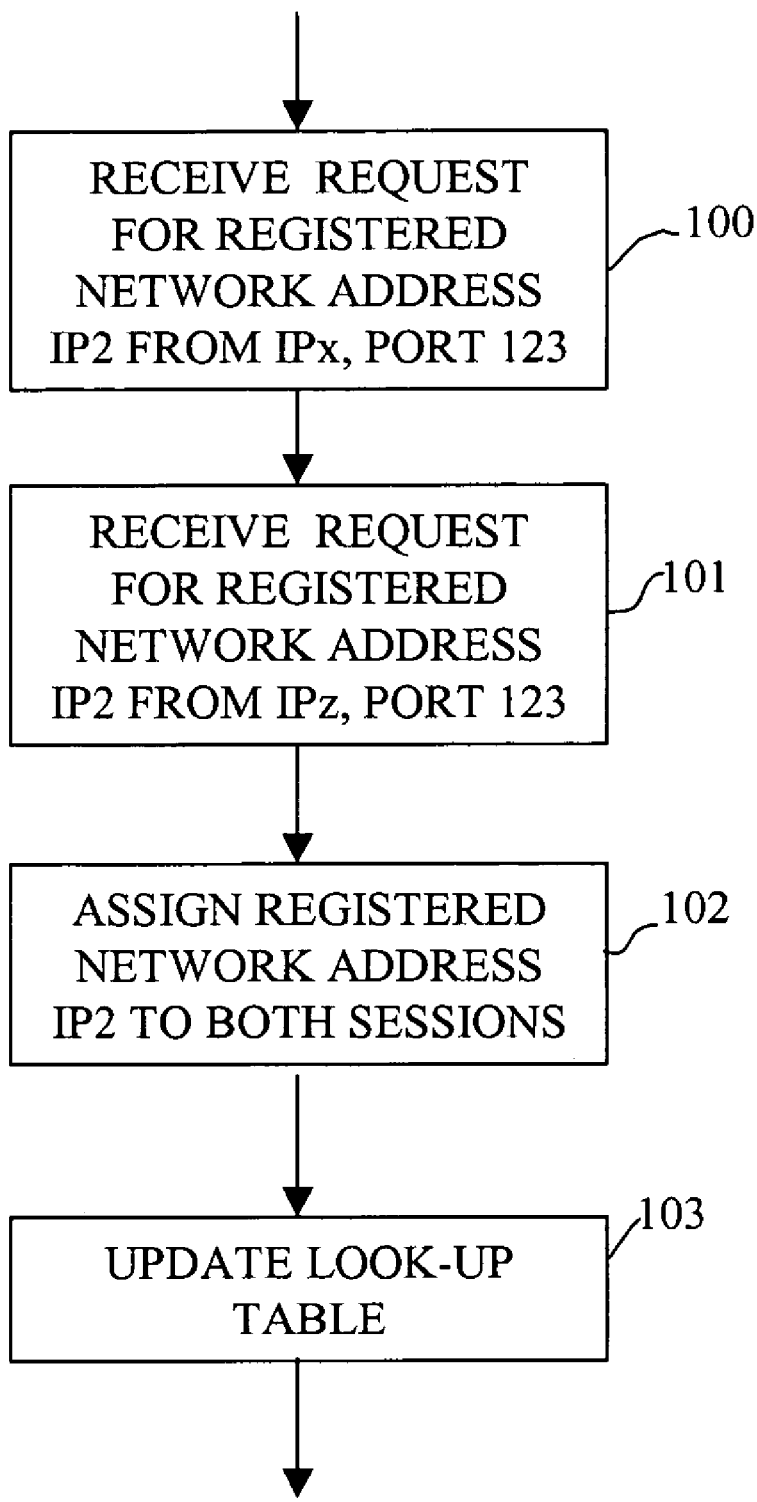
FIG. 9 is a flowchart of an embodiment of a process for reconciling two communication sessions requesting the same registered network address.

Referring to FIG. 9 for a flowchart of an embodiment of a process for reconciling two competing sessions. For example, consider that a first FTP session request is from address IPx and initial port 123 (step 100), and a second one is from address IPz and port 123 (step 101). Further, both sessions request the use of a registered address of $IP_2$. The first session has a destination FTP server at address IP1 and port 23, and the second session has a destination FTP server at address $IP_3$ and port 23. In this case, the DPM server will still allow the same registered IP address IP2 and port 123 to be used concurrently by the two FTP sessions (step 102) and the look-up table is updated accordingly (step 103). The reason that the DPM server can do so is because the look-up table can distinguish the two sessions by two different destination IP addresses (i.e., $IP_1$ and $IP_3$) for future communications. For example, the look-up table for this example may show:

DPM server is not necessarily located at the same location as the private network. In today's web centric networking environment, a private network can easily exist in a virtual manner in that all the computers/servers belonging to the private network can locate at different locations while still connected to the gateway through the web as long as the gateway can be identified at any moment. To the extent that the gateway is connectable to and accessible by the individual computers, the NAT and NAPT features as described above executed by the DPM server-driver can be carried out seamlessly regardless where the gateway or the computers in the private network are located. It is therefore also contemplated by the present invention that the function of the gateway can be centrally located and provided as an Application Service Provider. This can reduce the burden of each private network to have its gateway managed independently.

Another advantage of the present invention is that two different communication components can be used: the DPM driver and the DPM server which adds intelligence on packet processing. Moreover, both the DPM driver and server work together in a symmetric mode of communication. That is, the driver and server work in both communication directions.

|  | SOURCE ADDRESS | SOURCE PORT NO. | ASSIGNED SOURCE ADDR. | ASSIGNED SOURCE PORT NO. | DEST. ADDRESS | DEST. PORT NO. |
|---|---|---|---|---|---|---|
| REQUEST 1 | IPx | 123 | $IP_2$ | 123 | $IP_1$ | 23 |
| REQUEST 2 | IPy | 123 | $IP_2$ | 123 | $IP_3$ | 23 |

When a return packet comes back from one of the destination FTP servers (step 106), although it is targeted for $IP_2$ and port 123, it can be identified and routed appropriately base on the fact that the IP addresses of the FTP servers can be differentiated, and that the look-up table provides the unique unregistered IP addresses of the computer inside the private network for further packet routing (steps 107 and 108). If at least one of the initial ports (e.g., 123) can be modified, a new port can be dynamically assigned to replace the initial port. From the perspective of the look-up table, the one-to-one relation between the DPM driver and server can more easily be identified since there is at least one more "differentiator" (i.e., the port used by DPM server for outgoing packets) available as compared to the situation where neither one of the ports are changeable.

In the above-described examples, communications between the various computers are discussed. It is well known that a typical computer may include a central processing unit and memory for processing and storing data and programs. The computers may also include external interface devices, such as a modem or network card. It is understood that each of the computers and networks discussed above may be similarly configured, or may be very different. It is also understood that other network nodes, such as mobile nodes using mobileIP, can benefit from the present invention.

The present disclosure uses the DPM driver-server pair for intelligently and dynamically arranging the use of both the registered IP addresses and the ports for communications among computing nodes to and from a private network. It is understood that the private network is not necessarily limited to a physical location, and the gateway installed with the While the invention has been particularly shown and described with reference to the preferred embodiment thereof, it will be understood by those skilled in the art that various changes in form and detail may be made therein without departing from the spirit and scope of the invention.

What is claimed is:

1. A method for dynamically managing port and network addresses for a first network using at least one dynamic port management (DPM) driver and a DPM server, the DPM driver being installed on a first node of the first network and the DPM server being installed on a gateway module of the first network, the first network using a first type of network address for its internal uses and having one or more network addresses of a second type for communicating with a second node outside of the first network, the method comprising:

obtaining a first port for an application session, the application session requiring communication with the second node;

exchanging information between the DPM driver and the DPM server for reserving a network address of the second type and, if the first port is replaceable, for dynamically assigning a second port;

using the network address of the second type and the dynamically assigned second port for completing the communications of the application session, wherein the information exchanged between the DPM driver and the DPM server indicates a network address and port for the second node;

reconciling two separate application sessions requesting the use of the same reserved network address of the second type and the first port while at least the first port associated with one of the application sessions is not replaceable; and recognizing, by the DPM server, data packets received for the two application sessions if both request the use of the first port, while neither of which is replaceable.

2. The method of claim 1 wherein the DPM driver uses a first network address of the first type, and the DPM server uses a predetermined port and a second network address of the first type for information exchanged between the DPM driver and the DPM server.

3. The method of claim 1 wherein the step of exchanging further comprises detecting, by the DPM driver, whether the first port for the application session is replaceable.

4. The method of claim 1 wherein the step of exchanging further comprises:

checking whether the first port is replaceable by the DPM server; and extracting the network address and port for the second node from a data segment of at least one packet sent by the DPM driver to the DPM server.

5. The method of claim 1 wherein the step of using further comprises changing, by the DPM driver, the network address of the second node and its port for the application session to the second network address of the first type and a predetermined port of the gateway for one or more packets of the application session.

6. The method of claim 1 wherein the step of using further comprises:

including, by the DPM server, the network address and port for the second node as a destination network address and destination port for one or more data packets of the application session initiated by the first node; and assigning the network address of the second type and the first port or the second port if the first port is replaceable as a source network address and source port for the data packets of the application session initiated by the first node.

7. The method of claim 1 further comprising updating a look-up table indicating a one-to-one relationship between the reserved network address associated with either the first port or the second port if the first port is replaced by the second port and the first network address of the first type associated with the first port.

8. The method of claim 1 wherein the step of recognizing uses the network address and port for the second node to distinguish each application session.

9. The method of claim 1 wherein the DPM driver responds to a request from the application session inquiring the network address and port used by the application session with the reserved network address of the second type and the dynamically assigned second port used by the DPM server if the first port is replaced by the second port.

10. A computer program stored in a computer readable medium for dynamically managing port and network addresses for a first network using at least one dynamic port management (DPM) driver and a DPM server, the DPM driver installed on a computer of the first network and the DPM server installed on a gateway module of the first network, the first network using a plurality of unregistered network address for its internal uses and having one or more registered network addresses for communicating with computers outside of the first network, the computer program comprising:

instructions for obtaining a first port from the DPM driver for an application session, the application session communicating with at least one computer outside of the first network;

instructions for exchanging information between the DPM driver and the DPM server for reserving a registered network address and, if the first port is replaceable, for dynamically assigning a second port; and instructions for using the reserved registered network address and the dynamically assigned second port for completing communications of the application session, instructions for recognizing, by the DPM server, data packets received for two separate application sessions requesting the use of the same reserved network address and the first port while neither of which is replaceable by using the network address and port for the computer outside of the first network to distinguish each application session;

wherein the information exchanged between the DPM driver and the DPM server indicates a network address and port for the computer outside of the first network communicating with the application session.

11. The computer program of claim 10 wherein the DPM driver uses a first unregistered network address, and the DPM server uses a second unregistered network address and a predetermined port for communications between the DPM driver and the DPM server.

12. The computer program of claim 10 further comprising instructions for updating a look-up table indicating a one-to-one relationship between the reserved registered network address associated with either the first port or the second port if the first port is replaced and the first unregistered network address associated with the first port.

13. The computer program of claim 10 wherein the instructions for exchanging further comprises:

instructions for checking whether the first port is replaceable; and instructions for extracting the network address and port for the computer outside of the first network from at least one packet used for exchanging information between the DPM driver and the DPM server.

14. The computer program of claim 10 wherein the instructions for using further comprises:

instructions for including the network address and port for the computer outside of the first network as a destination network address and destination port for at least one data packet of the application session initiated by the computer having the DPM driver installed thereon; and instructions for assigning the reserved network address and, if the first port is replaceable, the second port as a source network address and source port for the data packet.

15. The computer program of claim 10 further comprising instructions for reconciling two separate application sessions requesting the use of the same reserved network address and the first port while at least the first port associated with one of the application sessions is not replaceable.

16. The computer program of claim 15 wherein the DPM driver responds to a request from the application session inquiring the network address and port used by the application session with the reserved registered network address and the dynamically assigned second port used by the DPM server if the first port is replaced by the second port.

17. A method for dynamically managing port and network addresses for a first network using at least one dynamic port management (DPM) driver and a DPM server, the DPM driver installed on a computer of the first network and the DPM server installed on a gateway module of the first network, the first network using a plurality of unregistered network addresses for its internal use and having one or more registered network addresses for communicating with computers outside of the first network, the method comprising:

obtaining a first port for an application session, the application session communicating with at least one computer outside of the first network;

reserving a registered network address by exchanging information between the DPM driver and the DPM server;

detecting whether the first port is replaceable;

dynamically assigning a second port to replace the first port for the application session if the first port is replaceable;

extracting the network address and port for the computer outside of the first network from at least one packet used for exchanging information between the DPM driver and the DPM server;

including the network address and port for the computer outside of the first network as a destination network address and destination port for at least one data packet of the application session initiated by the computer of the first network;

assigning the reserved network address and either the first port or, if the first port is replaceable, the second port as a source network address and source port for the data packet; and reconciling two separate application sessions requesting the use of the same reserved network address and the first port while at least the first port associated with one of the application sessions is not replaceable by using the network address and the port for the computer outside of the first network to distinguish each application session.

18. The method of claim 17 further comprising using a look-up table indicating a one-to-one relationship between the reserved registered network address associated with either the first port or the second port if the first port is replaced and the first unregistered network address associated with the first port.

19. The method of claim 17 further comprising reconciling two separate application sessions requesting the use of the same reserved network address and the first port while the first port associated with at least one of the application sessions is by using the replaced port to differentiate the application sessions.

20. The method of claim 17 wherein the DPM driver responds to a request from the application session inquiring the network address and port used by the application session with the reserved registered network address and the dynamically assigned second port used by the DPM server if the first port is replaced by the second port.

* * * * *